United States Patent Office 3,161,615
Patented Dec. 15, 1964

3,161,615
RESINOUS COPOLYMERIC POLYCARBONATE OF A MIXTURE OF DIHYDRIC PHENOLS
Eugene P. Goldberg, Pittsfield, Mass., assignor to General Electric Company, a corporation of New York
No Drawing. Filed Feb. 5, 1957, Ser. No. 638,239
1 Claim. (Cl. 260—47)

This invention relates to copolymer compositions having desirable physical, chemical and electrical properties, and to their preparation. More particularly, it relates to copolymer polycarbonate compositions derived from aliphatic dihydroxy compounds and dihydric phenol compounds.

Various types of polycarbonate resins are known among which are those prepared by the vinyl polymerization of unsaturated carbonate esters such as allyl carbonates, etc. from the ester interchange of carbonate esters with glycols and by the reaction of dihydroxymonoaryl compounds such as hydroquinone and resorcinol with phosgene or carbonate esters. Such polycarbonate materials are of limited usefulness because they do not have a desirable combination of physical properties.

I have discovered a new class of copolymer polycarbonate compositions characterized by good physical, chemical and electrical properties. In general, my new compositions have a high softening point as well as desirable tensile strength, impact strength and, in many cases, these characteristics are combined with rubber-like elastic properties. They are low in density, are almost colorless, and are oil, acid and base resistant to a remarkable degree. On the other hand, they are readily soluble in certain organic solvents so that they can easily be made available in fiber, fibrous or film form from solutions. They are also readily fabricated into films and parts by usual molding and extrusion methods and are also useful in fluidized resin bed coating processes. Fibers can be spun from the melt as well as from solution.

Briefly stated, the compositions of this invention comprise carbonate copolymers containing structural units derived from dihydric phenols and aliphatic dihydroxy compounds or glycols, the desired units occurring in various manners in the copolymer chain. Certain of the copolymers are of a random type; that is, the structural units derived from the dihydric phenol and the glycol are propagated along the copolymer chain in a random fashion. Typical of such random copolymers are those resulting from the use of monomeric glycols and monomeric dihydric phenols. Others are of a random-block type; that is, the units making up the copolymer are randomly arranged but one of the unit structures is polymeric. Typical of random-block copolymers are those in which either the glycol or dihydric phenol derived structural unit is polymeric. Still other copolymers are of the block-block type in which the structural units derived from both the glycol and the dihydric phenol are polymeric.

In general, any aliphatic dihydroxy compound or glycol can be used. Included are the lower molecular weight aliphatic dihydroxy compounds such as ethylene glycol, propanediols, butanediols, pentanediols, hexanediols, heptanediols, octanediols, neopentyl glycol, arylalkyl glycols such as 4,4'-dihydroxyethyldiphenyl styrene glycol, xylylene glycols, dihydroxy alkyl ethers of dihydric phenols such as the dihydroxy ethyl ether of Bisphenol-A, thiodiglycols and cycloaliphatic glycols such as 1,4-dihydroxycyclohexane, 2,2-bis-(4-hydroxycyclohexyl)-propane, bis-(4-hydroxycyclohexyl)-methane, among others. Among the useful higher molecular weight aliphatic dihydroxy compounds are the polyethylene glycols, polystyrene glycols, polypropylene glycols, polybutylene glycols, polythioglycols, polyaryl-alkyl ether glycols and copolymer polyether glycols, the latter typified by polyethylene glycol, polypropylene glycol copolymers sold by Wyandotte Chemical Company and known as Pluronics, etc. Included also are dihydroxy compounds such as may be derived from dibasic acids and glycols; for example, the diethyleneglycol ester of adipic acid, or the diethyleneglycol ester of sebacic acid, the dineopentyl glycol ester of adipic acid or terephthalic acid, etc. Further glycols useful in connection with the invention are silanediols such as diphenylsilanediol, dimethylsilanediol, dimethylsilanediol dimer, methylphenylsilanediol, ethylphenylsilanediol, etc. Tertiary aminoglycols are also useful, including among others, N-phenyldiethanolamine, N-methyldiethanolamine, N-propyldiethanolamine and N-phenyldi-n-propanolamine. Any polymeric aliphatic material having hydroxyl end groups is useful, including polyethers, polyesters, polyurethanes, polyacetals and polysiloxanes. Furthermore, polymers terminated with —COCl groups, for example polyesters prepared from dibasic acid chlorides, are useful, as are polymers having —OCOCl end groups, such as polycarbonates prepared from phosgene. The aliphatic dihydroxy compounds or glycols can typically be represented by the formula:

(I)

where R is hydrogen or a monovalent hydrocarbon radical, for example alkyl radicals (e.g. methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.), as well as monovalent hydrocarbon radicals containing inert substituents thereon, such as halogen (chlorine, bromine, fluorine, etc.). It will be understood that where more than one R is used, they may be alike or different. $R_1$ can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. $R_1$ can also be a silane radical or can be polyalkoxy such as polyethoxy, polypropoxy, polythioethoxy, polybutoxy, polyphenylethoxy, or polyorganosiloxy, for example polydimethylsiloxy, polydiphenylsiloxy, polymethylphenylsiloxy, etc. $R_1$ can also consist of two or more alkylene or alkylidene groups such as above, separated by the residue of an aromatic nucleus, a tertiary amino radical, an ether radical, a carbonyl radical, a silane radical, or by a sulfur containing radical such as sulfide, sulfoxide, sulfone, etc. $R_1$ may also be a glycol dibasic acid ester residue derived from, for example, dibasic acids such as adipic, azelaic, sebacic, isophthalic, terephthalic and glycols such as have been disclosed above. Other groupings which can be represented by $R_1$ will occur to those skilled in the art. The ester residue can be polymeric or monomeric. The subscript $p$ can be a whole number including zero. The subscript $q$ is an integer which may be varied as desired and $R_1$, where $q$ is more than 1, may be like or different radicals. It is understood, of course, that mixtures of different glycols may be used and where glycol is mentioned, such mixtures are considered to be included. Any dihydric phenol compound is useful in the practice of the invention. The dihydric phenol compounds used in connection with the invention can typically be represented by the general formula:

(II)
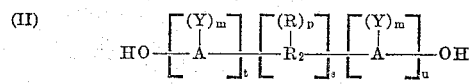

where R is a monovalent hydrocarbon radical as above, $R_2$ is selected from the group consisting of an alkylene and alkylidene residue in the same sense as $R_1$ or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on $R_2$, s ranges from zero to 1, t and u are whole numbers including zero. When s is zero, however, either t or u may be zero and not both.

In the dihydric phenol compound, the substituent Y may be the same or different as may be the R. Monovalent hydrocarbon radicals designated by R can be the same as those in reference to the compound of Formula I above, as may be those represented by $R_1$. Among the substituents represented by Y are halogen (e.g. chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where s is zero in Formula II, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenol)-propane (Bisphenol-A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene etc. Dihydroxy aryl sulfones such as those set forth in application Serial No. 613,817 filed October 4, 1956 assigned to the same assignee as this invention are also useful, e.g. bis-(p-hydroxyphenyl)-sulfone; 2,4'-dihydroxydiphenyl sulfone; 5'-chloro-2,4'-dihydroxydiphenyl sulfone; 5'-chloro-2'-4-dihydroxydiphenyl sulfone; 3'-chloro-4,4'-dihydroxydiphenyl sulfone; bis(4-hydroxy phenyl) biphenyl disulfone, etc. The preparation of these and other useful sulfones is described in Patent 2,288,282—Huissmann. Polysulfones as well as substituted sulfones using halogen, nitrogen, alkyl radicals etc. are also useful. Dihydroxy aromatic ethers such as those set forth in application Serial No. 598,768 filed July 19, 1955 assigned to the same assignee as this invention are also useful. Methods of preparing such materials are found in "Chemical Reviews" 38, 414–417 (1946) and Patent 2,739,171—Linn. Exemplary of such dihydroxy aromatic ethers are p,p'-dihydroxydiphenyl ether; p,p'dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3'-di-isobutyldiphenyl ether; 4,4'-dihydroxy-3,3'-diisopropyl phenyl ether; 4,4'-dihydroxy-3,2'-dinitrodiphenyl ether; 4,4' - dihydroxy - 3,3' - dichlorodiphenyl ether; 4,4' - dihydroxy-3,3'-difluorodiphenyl ether; 4,4'-dihydroxy-2,3'-dibromodiphenyl ether; 4,4'-dihydroxydinaphthyl ether; 4,4'-dihydroxy 3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether, 4,4'-dihydroxy-2,5-diethoxydiphenyl ether, etc. Mixtures of the dihydric phenols can also be employed and where dihydric phenol is mentioned herein, mixtures of such materials are considered to be included.

Generally speaking, the materials of the invention are prepared by reacting a dihydric phenol compound, a carbonate precursor such as phosgene, a carbonate ester etc. and an aliphatic dihydroxy material or glycol.

When a carbonate ester is used, the materials are reacted at temperatures of from about 150° C. to 300° C. or higher for times varying from 1 to 15 or more hours. Under such conditions, an ester interchange occurs between the carbonate ester and the dihydric phenol compound and the aliphatic dihydroxy compound. The ester interchange is advantageously carried out at reduced pressures of around 10 to 100 mm. of mercury preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins "Unit Processes in Organic Synthesis" (4th Edition, McGraw-Hill Book Company, 1952), pages 616 to 620. The amount of such catalyst is usually quite small and is of the order of 0.001 to 0.1% by weight, based on the total weight of the reactants.

The diaryl carbonates useful in this connection can be represented by the general formula:

(III)    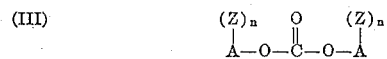

where A is an organic residue in the same sense as in Formula II, Z is an inorganic or organic radical in the same sense as Y of Formula II, and $n$ is an integer. Examples of carbonate esters comprise symmetrical carbonates, for example diphenyl carbonate, di-(halo-phenyl) carbonates, e.g. di-(chlorophenyl)carbonate, di-(bromophenyl) carbonate; di-(polyhalophenyl) carbonates, e.g. di-(trichlorophenyl) carbonate, di-(tribromophenyl) carbonate, etc.; di-(alkylphenyl) carbonates, e.g. di-(tolyl) carbonate, etc., di-(naphthyl) carbonate, di-(chloronaphthyl) carbonate, etc.; unsymmetrical carbonates, for example phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

Employing the above method of preparing the present copolymers by ester interchange, using a vacuum cook, the products in the final stages of the reaction become quite viscous and difficult to handle. In addition, the ester exchange process is not entirely satisfactory for preparing block copolymers when certain high molecular weight glycol materials such as polyester glycols are used, due to ester exchange reactions involving the polyester linkages of the glycol itself. I therefore prefer generally to carry out the reaction using phosgene or phosgene-like dibasic acid halide in an organic basic material such as a tertiary amine (e.g. pyridine, dimethylaniline, quinoline, etc.) The base can be used undiluted or diluted with inert solvents, for example hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 moles or more may be employed. The concentration of the dihydroxy reactants in solvent can also be varied, although I prefer for convenience a solution containing from about 1% to 25% by weight of dihydroxy compounds.

In general, the reaction is carried out by dissolving the dihydroxy reactants in the base, such as pyridine, and then bubbling phosgene into the stirred solution at the desired rate. The copolymer formed is separated and purified by any suitable means, as by pouring the reaction product into a stirred liquid capable of effecting precipitation, for example hydrocarbons, alcohols, etc. The precipitation can also be carried out by the addition of a non-solvent to the copolymer solution. Anhydrous precipitants are preferred but water can also be used. After filtration, the precipitate is washed with a material capable of removing pyridine and pyridine hydrochloride to yield, upon drying, a finely divided product. Isopropanol is conveniently used both as a precipitating and washing agent.

Suitable phosgene-like dibasic acid halides, in addition to phosgene, include, for example, dibromo and diiodo- carbonyls as well as the bishaloformates of dihydric phenols (e.g. bischloroformates of hydroquinone, Bisphenol-A etc.) or glycols (e.g. bischloroformates of ethylene glycol, neopentyl glycol, polyethylene glycol etc.). Other carbonate precursors will occur to those skilled in the art.

Copolymers can also be prepared by adding phosgene to an aqueous alkaline solution or suspension of the dihydroxy reactants. This is preferably done in the presence of inert solvents such as methylene chloride, benzene, toluene and the like. Quaternary ammonium compounds can be used to catalyze the reaction.

It will be seen that whether a carbonate ester or phosgene is used in the reaction, the dihydric phenol will produce a dihydric phenol carbonate structural unit which can typically be represented by the following general formula wherein the various letters have the same meaning as above:

(IV)    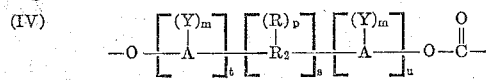

It will likewise be seen that the aliphatic dihydroxy material or glycol will during the reaction produce a glycol carbonate structural unit which typically can be represented by the following general formula wherein the various letters have the same meaning as above:

(V)    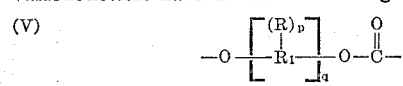

The following nine examples illustrate the preparation of copolymers of low molecular weight glycols and dihydric phenol compounds, said copolymers being of the random type or of such nature that the glycol and dihydric phenol compound derived structural units are randomly distributed in the copolymer chain.

In all examples, the tensile strength was measured according to ASTM procedures using a cast or compression molded test specimen about 5 to 7 mils thick and ½ inch to ¾ inch wide drawn at a speed of 2 inches per minute using an Instron Tester. At 25° C. the procedure was according to ASTM test D882-49T. At higher temperatures ASTM D759-48 was used. The intrinsic viscosity was in each case measured in dioxane except where otherwise noted and at 30.3° C. The impact strength of the materials was measured on a Dynstat Impact Tester using ⅛ inch x ⅜ inch x ⅝ inch specimens prepared by transfer molding, a C weight being used and the values being scale B readings. A 90° drop angle was used throughout. The heat distortion temperature was measured by a modified ASTM procedure using ⅛ inch x ⅜ inch x ⅝ inch specimens.

*Example 1*

To a reaction vessel there was added 45.6 g. (0.20 mole) Bisphenol-A and 3.1 g. (0.05 mole; 20 mole percent) of ethylene glycol in 500 cc. of dry pyridine. Phosgene was admitted to the reaction solution by bubbling at the rate of 0.4 g./min. for about 1 hour and the temperature maintained at 30°–35° C. An excess of about 28 mole percent phosgene was used. The copolymer was precipitated and washed with isopropanol and had an intrinsic viscosity of 0.87. The softening temperature was 200°–220° C. Clear, colorless films cast from chloroform solution of the material were tough and strong, having a tensile strength at 25° C. of 9270 p.s.i. and an elongation of 10%.

*Example 2*

Example 1 was repeated using 34.2 g. (0.15 mole) Bisphenol-A, 9.2 g. (0.15 mole, 50 mole percent) ethylene glycol, and 400 cc. of dry pyridine. About 13 mole percent excess of phosgene was used. The isopropanol precipitated and washed copolymer had an intrinsic viscosity of 0.65 and softened at 165° to 180° C. Clear films deposited from a chloroform solution of the material had a 25° C. tensile strength of 8450 p.s.i. and 30% elongation. Dynstat test pieces, transfer molded at 170° C., were clear and strong and failed to break in the Dynstat impact test. The heat distortion temperature was 124° C.

*Example 3*

Example 1 was repeated using 45.6 g. (0.20 mole) Bisphenol-A, 5.9 g. (0.05 mole, 20 mole percent) of 1,6-hexanediol and 400 cc. of dry pyridine. Phosgene was used in about 15 mole percent excess. The isopropanol precipitated and washed copolymer had an intrinsic viscosity of 0.83, a softening temperature of 165°–190° C. and readily transfer molded at 165° C. The heat distortion temperature was 113° C., and there was no break in the Dynstat impact test. At 25° C. the yield strength was 7720 p.s.i., the tensile strength 6260 p.s.i. and the elongation 100%. At 80° C. the yield strength was 3060 p.s.i., the tensile strength 2790 p.s.i. and the elongation 150%.

*Example 4*

Example 1 was repeated using 24.0 g. (0.10 mole, 50 mole percent) hydrogenated Bisphenol-A (2,2-bis-(4-hydroxycyclohexyl)-propane) and 22.8 g. (0.10 mole) Bisphenol-A in 400 cc. of dry pyridine. An excess of about 30 mole percent phosgene was used. The copolymer had an intrinsic viscosity as precipitated and washed with isopropanol of 0.45, a softening temperature of 190°–210° C., and a cast film made from a chloroform solution of the material had a tensile strength at 25° C. of 9000 p.s.i. and an elongation of 7%.

*Example 5*

Example 4 was repeated using 12.0 g. (20 mole percent) of the cycloaliphatic glycol. The copolymer had an intrinsic viscosity of 0.76 and a softening temperature of 205°–230° C.

*Example 6*

Example 1 was repeated using 31.9 g. (0.14 mole) Bisphenol-A, 13.0 g. (0.06 mole, 30 mole percent) diphenylsilanediol and 470 cc. dry pyridine. Phosgene was added until the reaction mixture became viscous. The copolymer had an intrinsic viscosity of 0.40 and a softening temperature of 170°–180° C. A clear, flexible, tough film, cast from methylene chloride solution, had a tensile strength of 7025 p.s.i., a yield strength of 8035 p.s.i. and 50% elongation at 25° C.

*Example 7*

Example 1 was repeated using 31.9 g. (0.014 mole) Bisphenol-A and 10.9 g. (0.06 mole, 30 mole percent) N-phenyldiethanolamine in 470 cc. dry pyridine. Phosgene was added until a viscous reaction mixture was obtained. The copolymer had an intrinsic viscosity of 0.45 and a softening temperature of 155°–175° C. A clear, flexible film, cast from methylene chloride solution, had a tensile strength of 5230 p.s.i., a yield strength of 7090 p.s.i. and 130% elongation at 25° C.

*Example 8*

Example 1 was repeated using 2.50 g. (0.01 mole) bis-(p-hydroxyphenyl)-sulfone and 2.50 g. (0.021 mole, 68 mole percent) 1,6-hexanediol in 50 cc. of dry pyridine adding phosgene until a viscous mixture resulted. The copolymer had an intrinsic viscosity of 0.18 (in tetrachloroethane) and a softening temperature of 32°–45° C.

*Example 9*

Example 1 was repeated using 2.50 g. (0.023 mole) hydroquinone and 2.50 g. (0.021 mole, 48 mole percent) 1,6-hexanediol in 50 cc. dry pyridine adding phosgene until the reaction mixture became viscous. The resultant copolymer had an intrinsic viscosity of 0.50 and a softening temperature of 70°–125° C.

The following Examples 10 through 26 illustrate the preparation of random-block type copolymers. In general, such materials may be prepared from high molecular weight glycols and monomeric dihydric phenols or from monomeric dihydroxy aliphatic compounds and polymeric dihydric phenols.

*Example 10*

The reaction vessel was charged with a solution of 45.6 g. (0.20 mole) Bisphenol-A and 40.0 g. (0.01 mole, 4.8 mole percent, 47 weight percent) of Carbowax 4000 in 500 cc. dry pyridine. Carbowax 4000 is a polyethylene glycol having a molecular weight of about 4000 and is sold by the Carbide and Carbon Chemical Company, as are all the other Carbowax materials mentioned herein. Phosgene was added with stirring to the above mixture at the rate of 0.40 g./min. for 1.1 hours at which time an excess of about 37 mole percent of phosgene was added and the reaction mixture became very viscous. The mixture was stirred for 2.5 hours after the phosgene addition. The copolymer was precipitated in a Waring blendor using isopropanol and also washed with this alcohol to give a finely divided copolymer having an intrinsic viscosity of 1.15. The copolymer was essentially colorless and was elastic and soluble in such solvents as chloroform, dioxane, methylene chloride, tetrachlorethane, chlorobenzene, tetrahydrofuran, etc. The material had a softening point of 190°–205° C. and was readily transfer and compression molded at 200° C. When a piece of material ⅛ inch x ⅜ inch x ⅝ inch was immersed for about 5 days at 80° C. in ASTM #3 oil, which is a swelling oil, there was an increase of only about 1% in the dimensions of the piece. The tensile strength of a film cast from chloroform solution was as follows:

| Tensile strength, p.s.i.: | Elongation, Percent |
|---|---|
| 5130 (25° C.) | 420 |
| 2990 (80° C.) | 625 |

Samples cold-drawn to a length of 58% in excess of their original length had average tensile strengths of 8500 p.s.i. and an elongation of 240% at 25° C.

*Example 11*

Example 10 was repeated except there were used 45.6 g. (0.20 mole) Bisphenol-A and 20.0 g. (0.005 mole, 2.4 mole percent, 30 weight percent) of Carbowax 4000 and 500 cc. of dry pyridine. About 30 mole percent excess of phosgene was added at the rate of 0.40 g./min. to produce a viscous reaction mixture. The isopropanol precipitated and washed copolymer was finely divided and had an intrinsic viscosity of 1.03. When films were cast from a chloroform solution of this material, they were not as elastic as were those of Example 10. The copolymer softened at 195°–205° C., transfer molded at 195° C. and compression molded readily at 200° C. In the Dynstat impact strength test, there was no breaking of the test piece.

Films tested on the Instron tester showed the following characteristics:

| Temp., ° C. | Yield, p.s.i. | Tensile Strength p.s.i. | Percent Elongation |
|---|---|---|---|
| 25 | 2,265 | 7,080 | 255 |
| 25 | ¹4,575 | ¹13,935 | ¹60 |
| 80 | 430 | 4,350 | 440 |
| 100 | 350 | 2,005 | 505 |
| 120 | 315 | 1,040 | 410 |

¹ Samples cold-drawn 125–150%.

When ⅛ inch x ⅜ inch x ⅝ inch samples were immersed in ASTM #3 swelling oil for one week at various temperatures, the results were as follows, all samples remaining tough and flexible.

| Temp., °C. | Weight Gain, Percent | Volume Swell, Percent |
| --- | --- | --- |
| 25 | 0.8 | 1.0 |
| 80 | 6.3 | 5.5 |
| 100 | 6.8 | 6.9 |
| 135 | 8.1 | 6.6 |

As compared to oil resistant rubbery materials such as butadiene and butadiene-acrylonitrile polymers, exhibiting from 17 to 35% volume swelling after only 48 hours at 70° C. in a swelling oil such as ASTM #3, the oil resistance of the above copolymers is excellent.

The electrical properties of the material were as follows:

Power factor (25° C., 1 megacycle) _____ 0.012.
Dielectric constant (25° C., 1 megacycle) _____ 3.50.
Arc resistance (ASTM 495—48%) _____ 58–188 sec.
Surface resistivity _____ $22 \times 10^9$ ohms.
Volume resistivity _____ $25 \times 10^{11}$ ohms.
Dielectric strength _____ 12 mil thick film.
    25° C., S/T [1] _____ 1410 volts per mil.
    25° C., S/S [2] _____ 750 volts per mil.
    100° C., S/T [1] _____ 584 volts per mil.
    100° C., S/S [2] _____ 250 volts per mil.

[1] S/T—denotes short time.
[2] S/S—denotes step by step.

Example 12

Example 10 was repeated using 45.6 g. (0.20 mole) Bisphenol-A, 5.0 g. (0.0013 mole, 0.6 mole percent, 9.9 weight percent) Carbowax 4000 and 400 cc. dry pyridine. An excess of 14 mole percent phosgene was used. When precipitated with isopropanol, the resin had an intrinsic viscosity of 0.82. The softening temperature was 200°–210° C., the heat distortion temperature 111° C. and the Dynstat impact strength test produced no break. The tensile strength was as follows at various temperatures:

| Temp., °C. | Yield, p.s.i. | Tensile Strength p.s.i. | Percent Elongation |
| --- | --- | --- | --- |
| 25 | 10,120 | 8,070 | 215 |
| 80 | 5,855 | 6,809 | 225 |
| 100 | 4,180 | 5,905 | 235 |
| 120 | 2,830 | 5,265 | 305 |

Example 13

Example 10 was repeated using 22.8 g. (0.10 mole) of Bisphenol-A, 40.0 g. (0.01 mole, 9.1 mole percent, 64 weight percent) Carbowax 4000 and 400 cc. dry pyridine. An excess of about 50 mole percent phosgene was used. The intrinsic viscosity as precipitated from isopropanol was 1.03. Films cast from a chloroform solution were highly elastic. The softening temperature of the copolymer ranged from 170°–190° C. The strength of the material was as follows at temperatures shown:

| Temp., °C. | Yield, p.s.i. | Tensile Strength p.s.i. | Percent Elongation |
| --- | --- | --- | --- |
| 25 | 410 | 4,070 | 740 |
| 80 | 310 | 1,235 | 650 |

Example 14

Example 10 was repeated except that 45.6 g. (0.20 mole) of Bisphenol-A, 20.0 g. (0.001 mole, 0.5 mole percent) of Carbowax 20,000 and 400 cc. of dry pyridine were used. Carbowax 20,000 is a polyethylene glycol of about 20,000 molecular weight. An excess of about 25 mole percent of phosgene was used. The isopropanol precipitated material had an intrinsic viscosity greater than 1.6. It was soluble in dioxane, chloroform and tetrachloroethane only on long standing. The copolymer softened at 185°–200° C. and transfer molded at 200° C. The heat distortion temperature was 128° C. and no break occurred in the Dynstat impact test. At 25° C. the material had a yield strength of 4760 p.s.i., a tensile strength of 6350 p.s.i. and 195% elongation.

Example 15

Example 10 was repeated except that 45.6 g. (0.20 mole) Bisphenol-A and 40.0 g. (0.02 mole, 9.1 mole percent) of polypropylene glycol having a molecular weight of 2000 and 500 cc. of dry pyridine were used. An excess of about 27 mole percent phosgene was employed. The isopropanol precipitated copolymer had an intrinsic viscosity of 0.20 and softened at 160°–190° C.

Example 16

Example 10 was repeated using 34.2 g. (0.15 mole) Bisphenol-A and 30.0 g. of a poly-(ethylene isophthalate) having an intrinsic viscosity of 0.13 and having terminal hydroxyl groups. These materials were dissolved in 400 cc. of dry pyridine. An excess of about 25 mole percent phosgene was employed. The copolymer had an intrinsic viscosity of 0.56, a softening temperature of 165°–180° C. and transfer molded readily at 175° C. The heat distortion temperature was 89° C. and the Dynstat impact reading less than 1. The tensile strength at 25° C. was 11,420 p.s.i. and the elongation 10%.

Example 17

Example 16 was repeated using 45.6 g. Bisphenol-A and 40.0 g. of a hydroxyl terminated poly-(ethylene isophthalate), having an intrinsic viscosity of less than 0.1, in 500 cc. of dry pyridine. An excess of about 20 mole percent of phosgene was used. The copolymer had an intrinsic viscosity of 0.63, a softening temperature of 155°–175° C. and transfer molded readily at 155° C. The heat distortion temperature was 86° C. and the Dynstat impact reading was 2–3.

Example 18

Example 16 was repeated using a hydroxyl terminated poly-(ethylene isophthalate) polymer having an intrinsic viscosity of 0.28 as the glycol. The copolymer had an intrinsic viscosity of 0.61 and a softening temperature of 180°–190° C., and transfer molded at 185° C. The heat distortion temperature was 113° C. and the Dynstat impact reading was 2–3. The tensile strength at 25° C. was 10,070 p.s.i. and the elongation 8%.

Example 19

To 10 g. of a hydroxyl terminated poly-(ethylene sebacate) and 10 g. of Bisphenol-A dissolved in 180 g. of dry pyridine, phosgene was added by bubbling as described hereinbefore with agitation until the reaction mixture became viscous. The isopropanol precipitated copolymer had a tensile strength at 25° C. of 7500 p.s.i. and an elongation of 350% for films cast from chloroform.

Example 20

Example 19 was repeated using 75 weight percent of the poly-(ethylene sebacate) glycol and 25 weight percent of Bisphenol-A. The tensile strength of a film cast from chloroform solution was 5000 p.s.i. and the elongation 450% at 25° C. At 100° C. the tensile strength was 800 p.s.i. and the elongation 1000%.

Example 21

Example 19 was repeated using 25 weight percent of the poly-(ethylene sebacate) glycol and 75 weight percent of Bisphenol-A. At 25° C. the tensile strength of the copolymer was 9500 p.s.i. At 100° C. the tensile strength was 6500 p.s.i. and the elongation 270%.

Example 22

Ten grams of a hydroxyl terminated poly-(ethylene adipate) and 10 g. of Bisphenol-A were dissolved in about 180 g. of dry pyridine. Phosgene was added until the reaction mixture became viscous. A film of the copolymer, cast from chloroform solution, had a tensile strength of 4500 p.s.i. and 290% elongation at 25° C. The above was repeated using 75 weight percent Bisphenol-A and 25 weight percent Bisphenol-A, again to produce copolymers which produce clear tough films.

Example 23

To a solution of 5.9 g. (0.05 mole) of 1,6-hexanediol in 100 cc. of dry pyridine, phosgene was added with stirring at the rate of 0.5 g. per minute until the reaction mixture started to become viscous. At this point, the hexanediol polycarbonate solution was added to a solution of 45.6 (0.20 mole) Bisphenol-A and 300 cc. of dry pyridine and phosgene bubbled therein at the above rate until the mixture became very viscous. The isopropanol precipitated copolymer had an intrinsic viscosity of 0.69, softening temperature of 165°–180° C., a heat distortion temperature of 106° C., and a Dynstat impact reading of less than 1. The tensile strength at 25° C. was 11,420 p.s.i. and the elongation 10%.

Example 24

A copolymer was prepared by mixing together 20.0 g. (0.02 mole, 16.7 mole percent) polybutylene glycol of 1000 molecular weight with 22.8 g. (0.1 mole) Bisphenol-A in 400 cc. of dry pyridine and adding phosgene as above until the mixture became viscous. The rubbery copolymer had an intrinsic viscosity of 0.26, a softening temperature of 165°–195° C. and a tensile strength of 1830 p.s.i. with 110% elongation at 25° C.

Example 25

A copolymer was prepared by mixing 2.00 g. (0.008 mole) bis-(p-hydroxylphenyl)-sulfone with 3.5 g. (0.0009 mole, 10 mole percent) Carbowax 4000 and 50 cc. dry pyridine, adding phosgene as above to produce a viscous reaction mixture. The rubbery material had a softening temperature of 170°–185° C. It was soluble in dimethyl sulfoxide and pyridine and only partially soluble in methylene chloride, chloroform and dioxane.

Example 26

Example 25 was repeated using 4.00 g. (0.16 mole) bis-(p-hydroxyphenyl)-sulfone and 1.50 g. (0.0004 mole, 2.4 mole percent) Carbowax 4000. The copolymer had a softening temperature of 140°–180° C. and had solubility similar to the polymer of Example 25.

The following examples illustrate copolymers in which blocks of glycol derived structural units and blocks of dihydric phenol derived structural units occur in the copolymer chain.

Example 27

Phosgene was added as in Example 1 to a solution of 45.6 g. (0.20 mole) Bisphenol-A in 400 cc. of dry pyridine until the mixture became viscous. A solution of 20.0 g. (0.005 mole, 2.4 mole percent) of Carbowax 4000 in 100 cc. of dry pyridine was then added to the reaction mixture with further addition of phosgene. When the reaction mixture had become very viscous, the copolymer was precipitated with isopropanol. The intrinsic viscosity was 0.90, the softening temperature 165°–200° C., and cast films had at 25° C. a tensile strength of 3960 p.s.i. with an elongation of 80%.

Example 28

Example 27 was repeated except that the Bisphenol-A phosgene reaction mixture had not become very viscous when the Carbowax solution was added. The resulting copolymer had an intrinsic viscosity of 0.82, a softening temperature of 175°–190° C. and a tensile strength at 25° C. of 4960 p.s.i. with an elongation of 22%. This example illustrates a material wherein the dihydric phenol polycarbonate blocks are relatively shorter than in the previous example.

From the above, it will be evident that the materials of the invention have many and varied uses. Because of their high softening point they are useful in electrical applications and where solvent resistance and chemical inertness are required. The materials can be used in molding powder formulations either alone or in combination with fillers such as wood flour, diatomaceous earth, silica, carbon black, etc. to make molded parts of varied shapes. They are useful for preparing gaskets, tubing and other materials which are resistant to chemicals and oil.

Films of the copolymers prepared in conventional ways are useful as wrapping or packaging materials, as metal or fiber liners, containers, covers, closures, electrical insulating tapes, sound recording tapes, pipe coverings, etc.

Films and fibers of the material can be beneficially oriented or drawn at elevated temperatures, such as from 50° C.–200° C. In many cases the tensile strength of the copolymers can be more than doubled by cold drawing. The fiber form of the material can be used for yarn, thread, bristles, rope etc. and are readily dyed.

Because of their properties, the copolymers can be used as surface coverings for appliances and the like or as coatings for rods and wire, as slot insulation in dynamoelectric machines and as bonding material for parts or laminates and in adhesive formulations. They are also efficacious in wire enamels, varnishes and paints and can be readily mixed with pigments, stabilizers, plasticizers, etc. The compositions of the invention can also be alloyed with other resinous materials.

What I claim as new and desire to secure by Letters Patent of the United States is:

A high molecular weight, resinous, copolymeric polycarbonate of (1) a dihydric phenol, (2) a dihydroxyalkyl ether of a dihydric phenol, and (3) carbonic acid.

References Cited by the Examiner

UNITED STATES PATENTS

| | | | |
|---|---|---|---|
| 2,789,966 | 4/57 | Reynolds et al. | 260—47 |
| 2,789,967 | 4/57 | Reynolds et al. | 260—47 |
| 2,991,273 | 7/61 | Hechelhammer et al. | 260—47X |
| 3,000,849 | 9/61 | Clachan et al. | 260—860 |

FOREIGN PATENTS 546,375   4/56   Belgium.

OTHER REFERENCES

Schell (German printed application), Ser. No. F17166, Oct. 11, 1956.

WILLIAM H. SHORT, *Primary Examiner.*

P. E. MANGAN, H. N. BURSTEIN, MILTON STERMAN, *Examiners.*